(12) United States Patent
Beehag et al.

(10) Patent No.: US 8,197,624 B2
(45) Date of Patent: Jun. 12, 2012

(54) WELDING OF FUNCTIONAL COMPONENTS TO POLYMER COMPOSITE COMPONENTS

(75) Inventors: Andrew Beehag, Glebe (AU); Adrian Jackson, Ferny Creek (AU); Meng Hou, Telopea (AU); Rowan Paton, Brighton (AU)

(73) Assignee: CRC For Advanced Composite Structures, Limited, Fishermens Bend, Victoria (AU)

( * ) Notice: Subject to any disclaimer, the term of this patent is extended or adjusted under 35 U.S.C. 154(b) by 857 days.

(21) Appl. No.: 12/294,837

(22) PCT Filed: Mar. 28, 2007

(86) PCT No.: PCT/AU2007/000395
§ 371 (c)(1),
(2), (4) Date: Sep. 26, 2008

(87) PCT Pub. No.: WO2007/109855
PCT Pub. Date: Oct. 4, 2007

(65) Prior Publication Data
US 2010/0173161 A1      Jul. 8, 2010

(30) Foreign Application Priority Data
Mar. 28, 2006   (AU) ................................. 2006901580

(51) Int. Cl.
*B32B 37/00*     (2006.01)
(52) U.S. Cl. ...................................... 156/73.1; 156/73.5
(58) Field of Classification Search ................ 156/73.1, 156/73.5, 73.6, 310, 311, 580; 264/68, 69
See application file for complete search history.

(56) References Cited

U.S. PATENT DOCUMENTS

| | | | |
|---|---|---|---|
| 3,244,574 A | 4/1966 | Decker et al. | |
| 3,822,465 A | 7/1974 | Frankort et al. | |
| 4,561,561 A | 12/1985 | Ichikawa et al. | |
| 5,147,082 A | 9/1992 | Krause et al. | |
| 5,397,408 A | 3/1995 | Guzik et al. | |
| 5,660,669 A | 8/1997 | Mittleider | |
| 5,667,881 A | 9/1997 | Rasmussen et al. | |
| 6,001,201 A * | 12/1999 | Vincent et al. | 156/73.1 |
| 6,103,035 A | 8/2000 | Hanson et al. | |
| 6,523,734 B1 | 2/2003 | Kawai et al. | |
| 6,797,089 B2 | 9/2004 | Brahm et al. | |
| 2003/0066862 A1 | 4/2003 | Popoola et al. | |

OTHER PUBLICATIONS

International Search Report, PCT/AU2007/000395, Australian Patent Office, May 22, 2007.

* cited by examiner

*Primary Examiner* — James Sells
(74) *Attorney, Agent, or Firm* — Andrus, Sceales, Starke & Sawall, LLP

(57) ABSTRACT

A method for joining functional components with at least a thermoplastic components to thermosetting composites with at least some thermoplastic surface. The thermosetting composite has a functional thermoplastic surface layer attached by a process of selection of a compatible thermoplastic, heating the combined materials to allow migration of uncured thermosetting polymer into the thermoplastic polymer, then cooling the combined materials to provide a strongly attached thermoplastic surface. The thermosetting composite component may have a polymeric material coating. The present invention subsequently relates to the joining of the functional component and thermosetting polymer composite components, using high-speed oscillating relative displacement or high-speed continuous relative displacement.

14 Claims, 4 Drawing Sheets

WELDING OF FUNCTIONAL COMPONENTS TO POLYMER COMPOSITE COMPONENTS

CROSS REFERENCE TO RELATED APPLICATION

The present application is the U.S. national stage application of International Application PCT/AU2007/000395, filed Mar. 28, 2007, which international application was published on Oct. 4, 2007 as International Publication WO 2007/109855. The International Application claims priority of Australian Patent Application 2006901580, filed Mar. 28, 2006.

FIELD OF THE INVENTION

The present invention relates to the joining of thermoplastic polymer and thermosetting polymer composite components. In particular, the invention relates to the welding of a component containing thermoplastic polymer to a polymer composite component having a thermoplastic surface, by the application of high frequency vibration.

BACKGROUND OF THE INVENTION

Fibre reinforced polymer components, otherwise known as polymer composite components, consist of reinforcing fibres held together with a polymer resin, often known as the matrix. This matrix can be a thermosetting polymer such as an epoxy resin, in which case the composite component can be called a thermosetting composite component, or a thermoplastic polymer, also known as a thermoplastic, such as polyamide or polyetheretherketone, in which case the component can be called a thermoplastic composite component. It should be noted that a thermosetting composite component may contain small amounts of thermoplastic polymer, for instance as a surfacing film, a resin additive, or a binder agent. A thermoplastic composite component may in the same way contain small amounts of thermosetting polymer, for instance in a core or insert.

The majority of structural polymer composites have a thermosetting matrix. Therefore techniques for joining other components to these structural polymer composite components are based on the standard methods available for joining of thermosetting composites, mechanical fastening and adhesive bonding. These joining processes can be slow processes, and therefore add considerably to the expense of assembly, even for the attachment of small components.

Small functional components, also known as attachments or fittings, and including stand-offs, studs, bushings, and brackets, and similar items, are used to attach various things to structural thermosetting composite laminates and structures. Such functional components are traditionally metallic, but may also be made with thermoplastic, reinforced thermoplastic, fibre-reinforced composites of different sorts, and other materials, or combinations thereof. A high strength attachment can be obtained between such a functional component and a composite material if the functional component is embedded in the composite material prior to cure. However this is not always possible and frequently inconvenient. Attachment therefore is accomplished through the use of mechanical fasteners or adhesives to join the functional component. These methods are those that would also normally be used for joining functional components to structures made of metals and other materials. Mechanical fasteners provide high-strength attachment to composite laminates; however the attachment requires the drilling of holes in the composite laminate, resulting in a potential reduction in mechanical properties in the composite laminate. In many scenarios, it is far preferable to attach the functional component by adhesive bonding. However where adhesives are used, the functional components may be capable of far greater load carrying capacity than the adhesive bond. An additional barrier to strong adhesive bonding can occur when the composite component has been painted. In this circumstance, the strength of an adhesive bond is often governed by the low level of adhesion between the paint and component. Frequently this requires removal of paint in the vicinity of joining the functional component, in order to obtain reliable attachment.

Cheap and readily mass-produced functional components can be made of thermoplastic or reinforced thermoplastic, either wholly or in part. These have not been readily adopted, however, in part due to the difficulty in obtaining good adhesive bonds with such components. In order to make a high strength adhesive bond between a thermoplastic functional component and a thermosetting composite, the surfaces of both the thermosetting composite and thermoplastic functional component normally require surface treatment. In the case of the thermosetting composite this can be abrasion of the surface and cleaning with an appropriate solvent. In the case of the thermoplastic this can be one of a range of treatments such as corona discharge or gas-plasma treatment.

It is therefore desirable for the present invention to alleviate, at least in part, one or more of the above problems by providing a method for attaching a functional component, made partially or entirely of thermoplastic, to a thermosetting composite laminate or component. Advantageously, the process may be used to attach a functional component to the thermosetting composite component with very high attachment strength. More advantageously, the process is very rapid, and can allow significant cost reduction in the attachment of functional components to thermosetting composite surfaces. The process can be applied to both painted and unpainted composite components.

SUMMARY OF THE INVENTION

Broadly, the present invention involves a method for joining a functional component comprising at least partially of thermoplastic polymer to a thermosetting polymer composite component, that is, a component made largely of thermosetting polymer and reinforcing fibres.

A first embodiment of the invention provides a method of joining a functional component to a thermosetting polymer composite component, the thermosetting composite component comprising a thermosetting polymer composite material, with a thermoplastic polymer layer on at least the part of the surface to be joined, the method including the steps of:

selecting a functional component that has a second thermoplastic polymer at least on the surface to be joined, the second thermoplastic polymer being selected such that it can form high strength joints with the thermoplastic surface of said thermosetting polymer composite component in high-frequency oscillating relative displacement or high-speed continuous relative displacement welding operations;

locating the thermoplastic surface of said composite component in intimate contact with the thermoplastic surface of said functional component;

applying a high-frequency oscillating relative displacement or high-speed continuous relative displacement between said thermosetting polymer composite component and said functional component, such that at least a portion of the respective thermoplastic surfaces of the components at least partly melt and fuse;

halting the high-frequency oscillating relative displacement or high-speed continuous relative displacement and holding said thermosetting polymer composite component and said functional component together in a fixed relationship, such that the molten thermoplastic or thermoplastics resolidifies and the components are welded together.

Preferably, according to the first embodiment of the invention, the thermoplastic surface on at least the functional component or thermosetting polymer composite component will be shaped with one or more protrusions, or a surface texture, or energy directors, such that energy dissipated during high-frequency oscillating relative displacement or high-speed continuous relative displacement welding causes these protrusions to melt. The protrusions on the functional component may be sized to be less than or equal to the thickness of thermoplastic on the thermosetting component. Advantageously, this may assist in providing a seamless join between functional component and thermosetting composite component.

Preferably, according to the first embodiment of the invention, the thermoplastic surface is formed on the thermosetting polymer composite component by the steps of:
  selecting uncured thermosetting polymer composite resin constituents and a first thermoplastic polymer, that have Hansen solubility parameters indicative of the ability of the thermoplastic polymer and uncured thermosetting polymer resin constituents to interpenetrate;
  locating said thermoplastic polymer in contact with the uncured thermosetting polymer composite component, so that at least a part of one surface of the composite component when cured consists of said thermoplastic polymer;
  heating the thermoplastic polymer and uncured thermosetting polymer composite component to the curing temperature of the thermosetting polymer, the uncured thermosetting polymer resin constituents and the thermoplastic polymer being able to at least partly interpenetrate before the thermosetting polymer cures; and
  cooling the thermoplastic polymer and cured thermosetting polymer component such that the thermoplastic polymer is very strongly bonded to the cured thermosetting polymer component.

Advantageously, by integrating a thermoplastic surface onto the thermosetting polymer composite component during cure of the component, the thermoplastic polymer surface layer is attached with a high strength level to the thermosetting polymer composite.

A second embodiment of the invention provides a method of joining a functional component to a coated thermosetting polymer composite component, the thermosetting polymer composite component comprising a thermosetting polymer composite material with a thermoplastic polymer layer on at least the part of the surface to be joined and a polymeric coating covering the thermoplastic polymer layer, the method including the steps of:
  selecting a functional component that has a second thermoplastic polymer at least on the surface to be joined, the second thermoplastic polymer being selected such that it can form high strength joints with the thermoplastic surface beneath the polymeric coating of said thermosetting polymer composite component in high-frequency oscillating relative displacement or high-speed continuous relative displacement welding operations;
  locating the thermoplastic surface of said composite component in intimate contact with the coated thermoplastic surface of said functional component;
  applying a high-frequency oscillating relative displacement or high-speed continuous relative displacement between said thermosetting polymer composite component and said functional component, such that at least a portion of the polymeric material coating above the thermoplastic surface is displaced and at least a portion of the respective thermoplastic surfaces of the components come into contact, melt and fuse; and
  halting the high-frequency oscillating relative displacement or high-speed continuous relative displacement and holding said thermosetting polymer composite component and said functional component together in a fixed relationship, such that the molten thermoplastic or thermoplastics resolidifies and the components are joined together.

Preferably, according to the second embodiment of the invention, the thermoplastic surface on the functional component will be shaped with one or more protrusions, or a surface texture, or energy directors, such that energy dissipated during high-frequency oscillating relative displacement or high-speed continuous relative displacement welding causes these protrusions to melt. The protrusions on the functional component may be sized to be greater than the thickness of polymeric material coating covering the thermoplastic layer on the surface of the thermosetting composite component. Advantageously, this may assist in displacing the polymeric coating prior to the thermoplastic protrusions of the functional component and thermoplastic surface of the thermosetting composite component coming into contact, and at least partly melting and fusing.

It is preferable according to the second embodiment of the invention, that the coated thermosetting polymer composite is formed by the steps of:
  selecting uncured thermosetting polymer composite resin constituents and a first thermoplastic polymer, that have Hansen solubility parameters indicative of the ability of the thermoplastic polymer and uncured thermosetting polymer resin constituents to interpenetrate;
  locating said thermoplastic polymer in contact with the uncured thermosetting polymer composite component, so that at least a part of one surface of the composite component when cured consists of said thermoplastic polymer;
  heating the thermoplastic polymer and uncured thermosetting polymer composite component to the curing temperature of the thermosetting polymer, the uncured thermosetting polymer resin constituents and the thermoplastic polymer being able to at least partly interpenetrate before the thermosetting polymer cures;
  cooling the thermoplastic polymer and cured thermosetting polymer component such that the thermoplastic polymer is very strongly bonded to the cured thermosetting polymer component; and
  coating the thermosetting polymer component, including the thermoplastic surface, with a layer of polymeric material.

Advantageously, by integrating a thermoplastic surface onto the thermosetting polymer composite component during cure of the component, the thermoplastic polymer surface layer is attached with a high strength level to the thermosetting composite.

An additional advantage using either embodiment of the invention is that the functional component can be attached to the surface of the thermosetting polymer composite component without compromising the structural design or performance of the original composite component, which might occur for example in the drilling of holes to effect mechanical fastening.

Preferably for either embodiment, the functional component consists either of pure thermoplastic polymer, a copolymer of any sort or a polymer blend of any sort, or comprises some percentage of filler, fibre or other material within the thermoplastic material. Where the functional component is made entirely of thermoplastic or reinforced thermoplastic it can be simply manufactured by a process such as injection moulding. Alternatively, the functional component may consist of a filled or unfilled thermoplastic in combination with a metal subcomponent. Where the component is a combination of thermoplastic or reinforced thermoplastic and metal, the metal part can be manufactured by machining, forging, casting or a similar means, and thermoplastic or reinforced thermoplastic material placed over the metal as an assembly. Alternately part of the metal can be "overinjected" with thermoplastic or reinforced thermoplastic by placing the metal component in an injection moulding die.

The functional component may also be a larger component which is welded to the thermosetting polymer composite component in a series of local "spot" welds, or in a continuous "seam" welding operation where a long functional component and a thermosetting polymer composite component are moved laterally through the welder and the joint is made continuously by the welder.

Advantageously, where a minimum weld quality has been achieved through welding, the attachment strength of the functional component to the thermosetting polymer composite component will be dependent on the strength of either the thermoplastic attachment to the thermosetting polymer composite component, or the thermoplastic attached to the functional component. In the case of the thermosetting polymer composite component, very high strength can be achieved through interpenetration between the uncured thermosetting polymer and thermoplastic polymer by utilising the invention process. In the case of the functional component this is dependent on the design of the component, but for a pure thermoplastic component will be the strength of the base plastic.

In general the method for providing a weldable surface on a thermosetting composite will require the thermoplastic layer to have sufficient thickness to allow high-frequency oscillating relative displacement or high-speed continuous relative displacement welding to occur. Where there is insufficient thermoplastic on the surface of a thermosetting composite component for a particular welding operation, the method may also involve the addition of extra thermoplastic polymer, either pure polymer or polymer in combination with other materials, before or during this operation.

Advantageously, where a thermoplastic surface has been created on a thermosetting polymer composite component by the process of the invention, it may be used immediately or at a later date for the attachment of a functional component by means of the invention. In addition, where a functional component needs to be replaced, the functional component can be removed by means of cutting, grinding or a similar method, so long as thermoplastic is retained on the surface of the thermosetting polymer component. Alternately the functional component can be "unwelded" or removed by the application of heat from some source. The resulting surface may need to be suitably prepared, generally by flattening and cleaning, or by the addition or welding of extra thermoplastic material, after which another functional component can be welded in place, with high joint strength attainable.

One or more functional components can be welded to the thermosetting polymer composite component at each discrete region of thermoplastic surface on the composite. Furthermore, where multiple regions of thermoplastic surface are present on the surface of the thermosetting polymer composite component, functional components can be joined onto some or all of those regions.

According to another aspect of the invention, there is provided an apparatus for welding a functional component onto a thermosetting polymer composite component, comprising an actuator for applying a high-speed continuous relative displacement or high frequency oscillating relative displacement between the functional component and the thermosetting polymer composite component, a tool for applying relative displacement of the actuator to the functional component, and at least one structure for locating the actuator relative to the functional component and/or applying pressure to the functional component The welding apparatus of this aspect of the invention can apply high-speed continuous relative displacement, or high frequency oscillating relative displacement between the functional component and thermosetting polymer composite component. It is brought into contact with one of the components in the first and second embodiments of the invention. The welding apparatus may be a portable ultrasonic welding unit, having a hand-held portion, which typically operates at a frequency of 20 kHz. Alternately the welding apparatus may be a spin welding machine, which can apply a high speed rotational relative movement between the functional component and the thermosetting polymer composite component.

The welding tool, which applies the relative displacement to the functional component, optionally has a shaped interface that locates securely onto or holds the functional component. The tool may be solid or have a hollow centre to allow different shaped functional components to be welded.

The welding apparatus additionally has one or more structures for locating the actuator relative to the functional component and/or applying pressure to the functional component. The location and/or pressure structures are attached securely to the welding equipment during welding, in a manner that does not disrupt the application of the relative displacement to the components to be welded. These structures can restrain lateral movement of the welding apparatus, and additionally increase pressure of the welding tool on the components to be welded. Where the structures have the ability to be moved or adjusted relative to the high frequency welding apparatus, the structures can be securely locked to said welding apparatus prior to the welding operation, and subsequently released. Additionally the structures may allow a light extension force to be applied either continuously or periodically, allowing the structures to extend beyond the end of the welding tool for optimum alignment of the welding tool prior to welding operations. The structures may include a shroud or chamber which can be partially or fully evacuated, such that a net force is applied to the end of the welding tool. The shroud or chamber may include sealing components at one end, allowing an airtight seal to be made with the functional component or said thermosetting composite component.

In the invention, the term "thermoplastic polymer" may refer to a pure thermoplastic polymer, a copolymer of any sort or a polymer blend of any sort. The thermoplastic polymer may further comprise some percentage of filler, fibre or other material within the thermoplastic material. The thermoplastic polymer may be classed either as semi-crystalline or amorphous. Furthermore, where the respective thermoplastics are compatible in welding, the surfacing thermoplastic on the thermosetting composite component may be a different thermoplastic to that of the functional component.

The invention in another aspect provides a thermosetting composite component having a functional component attached by the method described above.

DETAILED DESCRIPTION OF THE EMBODIMENTS

It will be understood that the invention disclosed and defined in this specification extends to all alternative combinations of two or more of the individual features mentioned or evident from the text or drawings. All of these different combinations constitute various alternative aspects of the invention.

According to either the first or second embodiment of the invention, a thermosetting composite with a thermoplastic surface is required to successfully attach a fitting. A brief discussion follows on the successful formation of such a surfaced composite, material compatibility requirements, material selection and successful surface integration.

Polymer Thermodynamics and Solubility Criteria

The selection of compatible materials requires a close matching of several solubility parameters. The principle of material selection for a compatible amorphous thermoplastic is based on the Gibb's free energy of mixing ($\Delta G_m$), which states that $$\Delta G_m = \Delta H_m - T\Delta S_m \leq 0 \quad (1)$$

where $\Delta H_m$ is enthalpy of mixing, T is temperature and $\Delta S_m$ is entropy of mixing. The Hildebrand-Scatchard equation can then be used to determine the enthalpy of mixing as $$\Delta H_m = V\Phi_a\Phi_b(\delta_a - \delta_b)^2 \quad (2)$$

where $\delta_a$ and $\delta_b$ are the solubility parameters (also known as the Hildebrand parameters) of the two species considered, e.g. amorphous polymer and monomer or hardener.

Figure 1:
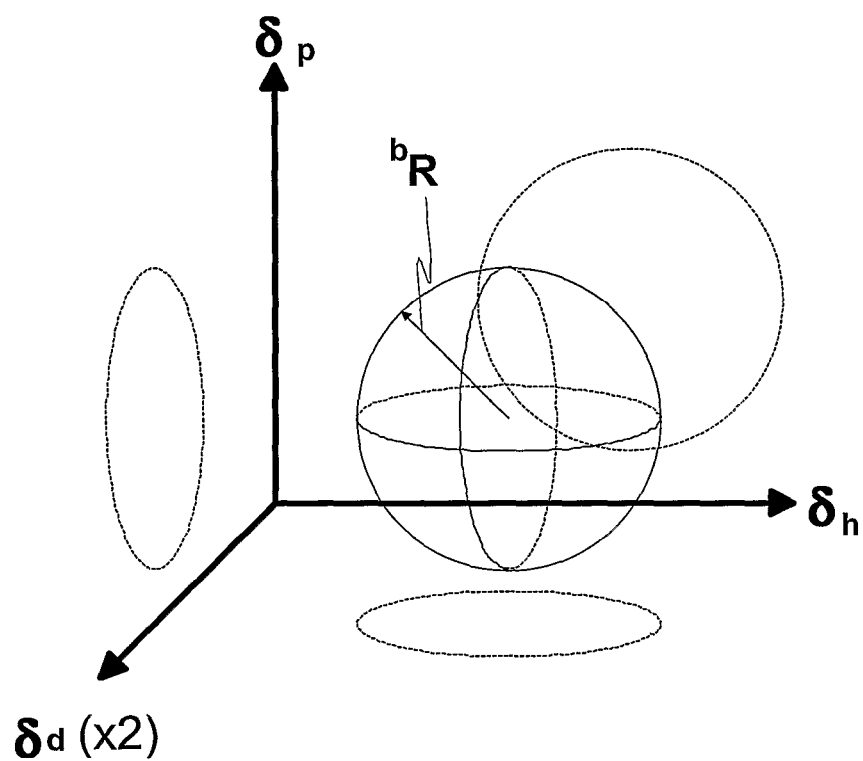
FIG. 1 illustrates a Hansen solubility diagram for a polymer, which can be used determine the suitability of a solvent for a particular polymer.

However, the use of the Hildebrand-Scatchard equation (Equation (2) above) may be inadequate for the class of high-performance semi-crystalline thermoplastics that may be applicable to the current invention, as intermolecular forces such as polar forces greatly affect the solubility behaviour of these polymers. The use of Hansen parameters which take account of dispersion, polar and hydrogen bonding forces is recommended as a suitable approach, which can equally be applied to amorphous and semi-crystalline polymers (See AFM Barton "CRC Handbook of Solubility Parameters and Other Cohesion Parameters", CRC Press, Boca Raton, 1983). The application of these parameters provides a reasonable guide for polymer-solvent compatibility. A radius of compatibility for polymer b is defined by radius $^b$R, as shown in the solubility chart in FIG. 1. The Hansen solubility parameters for dispersion ($\delta_d$), polar ($\delta_p$) and hydrogen bonding forces ($\delta_h$) for any solvent a can be determined and plotted on the chart. Where the point on the solubility chart locating the three Hansen parameters for solvent a ($^a\delta_d$, $^a\delta_d$, and $^a\delta_d$) lies within the sphere defined by $^b$R, the polymer is soluble in the solvent, i.e.

$$\left[4(^a\delta_d - ^b\delta_d)^2 + (^a\delta_p - ^b\delta_p)^2 + (^a\delta_h - ^b\delta_h)^2\right]^{1/2} < ^bR \quad (3)$$

where the solvent in this case is the monomer or hardener, and $^b$R is determined by standard experiments using common solvents of known Hansen parameters.

Material Selection and Surface Integration

A thermoplastic material selected according to the above criteria may be integrated successfully, by the formation of a substantial semi-interpenetrating polymer network (SIPN), onto the surface of a thermosetting polymer or thermosetting polymer material. An aspect of that process is the selection of a thermosetting polymer and a thermoplastic with a solubility determined by the use of Hansen parameters, and the selection of a curing temperature/time cycle such that the thermosetting monomer and hardener are able to migrate sufficiently into the amorphous polymer, or into the crystalline component of the semi-crystalline thermoplastic polymer by overcoming the heat of fusion of the crystalline component. Following cure of the component, the thermoplastic is intimately bonded to the component through the entanglement of molecular chains in the region of the original surfaces thereby forming a semi-interpenetrating polymer network between the thermosetting resin and the thermoplastic resin.

Advantageously, when the above thermodynamic and solubility compatibility criteria have been met, the bonding process may typically take place without any alteration to the manufacturer's recommended curing cycle for the thermosetting polymer.

Preferred Embodiments of the Invention

Figure 2:
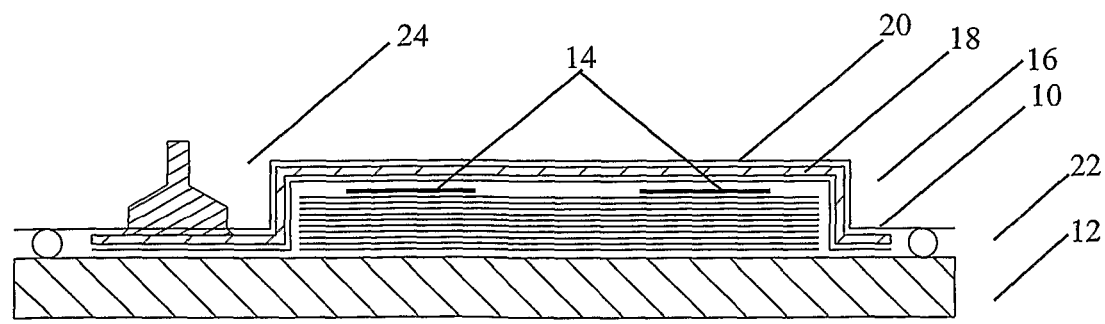
FIG. 2 is a schematic of thermosetting polymer composite prepreg and thermoplastic film prior to autoclave cure.

In the preferred embodiments of the invention, a first thermoplastic is selected for occurring with a thermosetting polymer composite, and a second thermoplastic, which may or may not be the same thermoplastic, is likewise selected for the functional component. As described above, optimal selection of thermoplastic for surfacing the thermosetting polymer composite is achieved by closely matching complex solubility parameters of the thermoplastic and uncured thermosetting polymer components. The technique can be successfully used to select a candidate amorphous or semi-crystalline polymer, with high attachment strength achievable. The method according to the preferred form of the invention is suitable for use with uncured thermosetting polymer composite components. An example is the curing of preimpregnated fabric (prepreg) composites in an autoclave, shown in FIG. 2. A stack of prepreg 10 is placed on a curing tool 12, with discrete areas of thermoplastic 14 placed on the outermost surface. It is generally convenient to have the thermoplastic in film form. The combined prepreg and thermoplastic is then ideally covered in a perforated film 16 and breather material 18, with a nylon bagging film 20 being sealed to the tool with a sealing tape 22. The whole assembly is then evacuated through a vacuum port 24, before being placed inside an autoclave. The assembly is raised in temperature and pressure, and is brought to a temperature where solution compatibility is such that migration of the uncured thermosetting polymer components into the thermoplastic can occur i.e. interpenetration of the thermosetting and thermoplastic polymers occurs to a sufficient depth to achieve high joint strength in the resulting surfaced component. The temperature for migration can be the cure temperature of the thermosetting polymer.

However where insufficient migration of the uncured polymer components occurs at this temperature, a lower temperature dwell may be included in the cure cycle to enhance the interpenetration region. Following cure of the thermosetting polymer, the assembly is cooled and removed from the autoclave, giving a thermosetting polymer composite with at least a partially thermoplastic surface.

The technique described above for the curing and surface integration of thermoplastic onto a thermosetting polymer composite is not limited to autoclave curing of prepreg composites and can be accomplished, with modification to the layup and curing procedure, with a number of other thermosetting composite manufacturing methods, if the uncured thermosetting polymer components can be brought in contact with the thermoplastic prior to cure of the thermosetting polymer, and migration of the uncured thermosetting polymer components can occur.

The thermoplastic for the welding surface of the functional component is required to fulfil several separate purposes. The thermoplastic must have blending or solution compatibility with the surfacing thermoplastic of the thermosetting polymer composite. There must also be compatibility between the thermoplastics and the chosen welding process, such that sufficient molecular mixing occurs during this phase. Finally, dependent on the functional component design, the thermoplastic should possess sufficiently high bulk mechanical properties to perform its intended role. Blending and solution compatibility will generally be assured by choosing an identical thermoplastic to the thermoplastic on the surface of the thermosetting polymer composite. However not all thermoplastics are well suited to high frequency joining operations; in particular, parts made from some semi-crystalline thermoplastics can suffer mechanical damage with specific geometries, compromising their later function. For this reason, and for efficient operation of the functional component, it may be necessary to select different thermoplastics for the functional component and thermosetting polymer composite surface. A number of different amorphous thermoplastics are known to be compatible in high frequency welding operations. Amorphous thermoplastic materials known to be compatible in high frequency welding operations include PEI and ABS, PMMA and ABS, and PPO and PS. Fewer semi-crystalline thermoplastics are known to be compatible in high-frequency welding operations, examples being PET and PEI, and PET and PC.

Figure 3A:
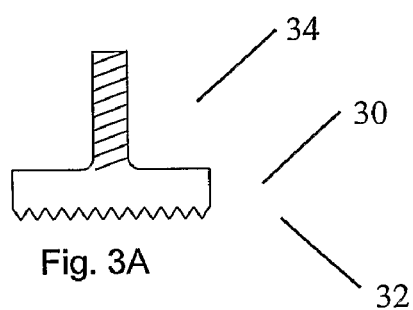
FIG. 3A is a schematic of a generic functional component or fitting made from thermoplastic or reinforced thermoplastic.
Figure 3B:
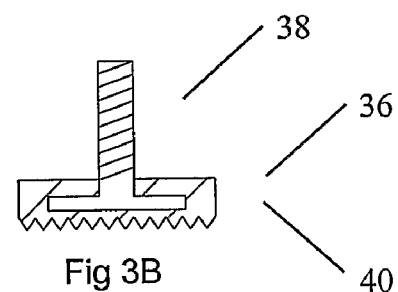
FIG. 3B is a schematic of a generic functional component or fitting made from a metallic component, having a base encased with thermoplastic.
Figure 3C:
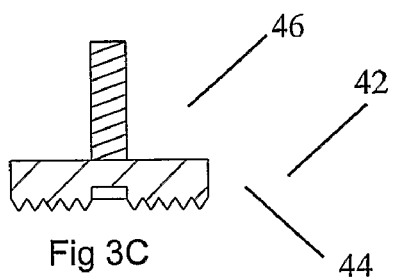
FIG. 3C is a schematic of a generic functional component or fitting made from a metallic component, inserted into a thermoplastic base.
Figure 3D:
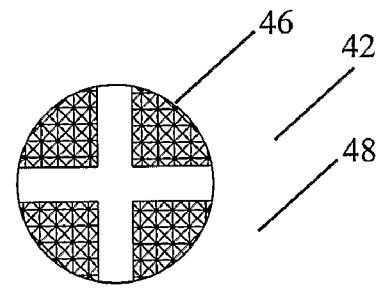
FIG. 3D is an underside view of FIG. 3C, showing a partial metallic base and pyramid-shaped energy directors in the thermoplastic base.

Examples of functional components are shown in FIG. 3. FIG. 3A shows a thermoplastic functional component 30, having a lower surface 32 for joining to a thermoplastic surface of a thermosetting polymer composite, and a functional end 34, in this case a threaded post, for separate use. The joining surface 32 has a number of protrusions to assist in controlled heating during high frequency welding, particularly for ultrasonic welding. These protrusions tend to heat more quickly than the adjacent thermoplastic under high frequency cyclical displacement. Where the first embodiment of the invention is utilised, the height of the protrusions is preferably less than or equal to the thickness of the thermoplastic on the thermosetting composite compound. However the height of the protrusions may need to be kept approximately the same as the thickness of thermoplastic surface on the thermosetting polymer composite, in order to obtain optimised weld strength. A minimum recommended thickness of thermoplastic on the surface of the thermosetting composite component is 20 µm, while the maximum thermoplastic thickness is limited by practicalities of weight, dimension and cost and for the performance of the invention is preferably no more than 5 mm. When the protrusions are similar or identical in height to the thickness of the thermoplastic layer on the composite component, it is possible to obtain near seamless joining between the functional component and thermoplastic surface of the composite, providing maximum attachment strength. A different approach is required for the second embodiment of the invention, where a polymeric coating is located between the thermoplastic of the functional component and the thermoplastic on the thermosetting composite component. In order to obtain an effective weld, the coating must be displaced during the welding operation. Where protrusions are used, these must be of sufficient height that displaced coating can be accommodated in gaps between the functional component and thermosetting composite component. It is preferable that the height of the protrusions are greater than the thickness of the polymeric coating covering the thermoplastic layer on the surface of the thermosetting polymer composite component. A protrusion height of at least 0.5 mm is recommended for robustness of process, although attachment may be achievable with shorter protrusions.

Where particular properties are needed from the functional component, it may be preferable to have some part of the component manufactured from a metal. One example of such a component is shown in FIG. 3B. The metal portion 38 of this functional component 36 could be manufactured by machining, casting or a similar process. Manufacture of the thermoplastic 40 encasing the metal portion 38 of the functional component could later be achieved through overinjection of the metal portion 38 in an injection moulder. The component has the advantage for the purposes of the invention of having a thermoplastic welding interface, high attachment strength to the metal portion of the component, and a functional metal portion. A similar functional component 42 is shown in FIG. 3C, made from both metal and thermoplastic. In this example the thermoplastic portion 44 and metal portion 46 can be manufactured separately and later assembled. The base of this example component, shown schematically in FIG. 3D, has a thermoplastic base 48 with pyramid-shaped ultrasonic welding energy directors. The metal component 46 would ideally be designed for assembly to a composite component, such that it had a specific clearance from the composite component when brought into initial contact, and following completion of the welding operation could be in contact with the composite component.

Materials for such functional components are not limited to metal and thermoplastic or reinforced thermoplastic. Functional components may also have a portion that is ceramic, include electronic componentry, or include a variety of other materials. The functional components should retain a portion that is thermoplastic, however, enabling them to be joined to the thermosetting polymer composite component in the manner described by the invention.

Figure 4:
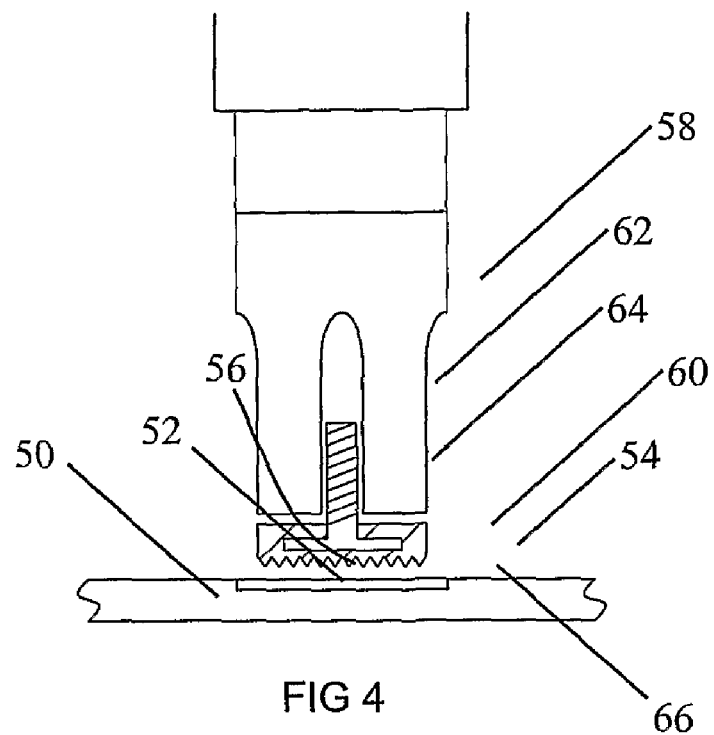
FIG. 4 is a schematic of a functional component or fitting similar to 3B, a cured thermosetting composite component with a thermoplastic surface, and the lower segment of a welding apparatus.

One method of joining the functional component to the thermosetting polymer composite component is to use a high frequency cyclic displacement system, such as an ultrasonic welder with horn. An example of a welding operation is shown in FIG. 4. A thermosetting polymer composite component 50, made according to a preferred method in the first embodiment of the invention, has a thermoplastic surface 52 on a region of the component. A functional component 54, selected and/or designed according to the process of the invention, is placed with its thermoplastic surface 56 against the thermoplastic surface 52 of the composite component 50. An ultrasonic welder horn 58 is then brought against the top face 60 of the functional component 54, such that pressure is applied through the welder horn 58 to the mating thermoplastic surfaces 52, 56 of the functional component 54 and composite component 50. In the current example, the ultrasonic welder horn 58 has a hollow section 62 to accommodate the post 64 of the functional component 54. A high frequency cyclic displacement is then transferred to the functional component 54, such that first the energy directors 66, and then at least some of the adjacent thermoplastic materials, in the component heat and melt, resulting in the eventual mixing of the functional component thermoplastic surface 56 and composite thermoplastic surface 52. Typically the process will occur for between 0.5 and 10 seconds, dependent on factors such as amplitude and frequency. The cyclic displacement is then stopped, while the assembly continues to be held together, while it cools. Frictional methods, such as spin welding, may alternatively be used to generate localised heat between the thermoplastic protrusions of the functional component and the thermoplastic surface of the composite component. The use of thermoplastic protrusions is not absolutely necessary for frictional welding, but is preferred for providing a controlled welding process.

Figure 5:
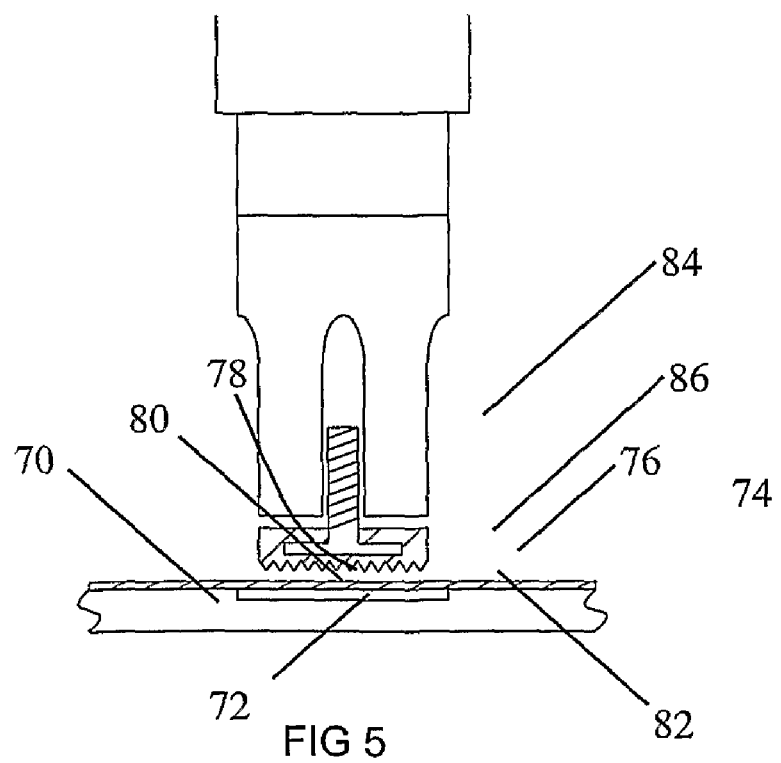
FIG. 5 is a schematic of a functional component or fitting similar to 3B, a cured thermosetting composite component with a thermoplastic surface having a polymeric coating, and the lower segment of a welding apparatus.
Figure 6A:
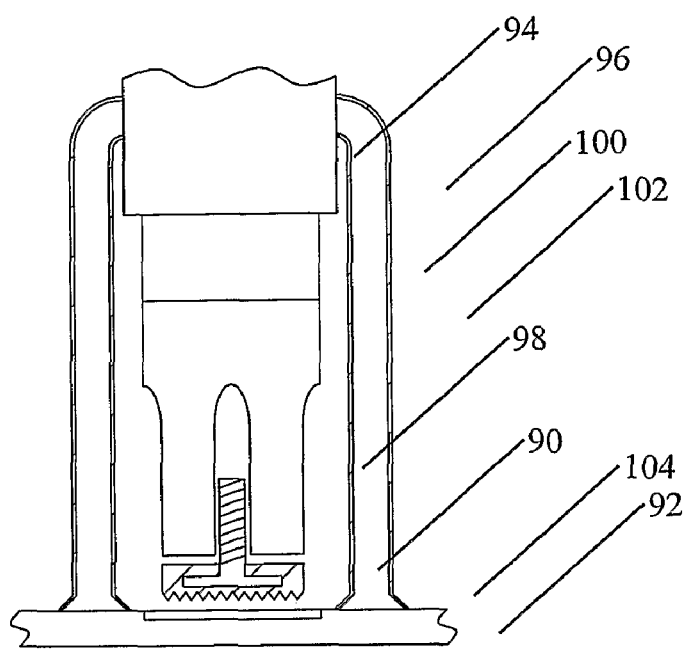
FIG. 6A is a schematic of a functional component or fitting similar to 3B, a cured thermosetting composite component with a thermoplastic surface, and the lower segment of a welding apparatus with an annular vacuum shroud.

The process may similarly be conducted where the thermosetting polymer component has been coated in a polymeric material by techniques such as painting, powder coating, spraying, dipping, brushing, adhesive appliqué or any other means to provide a thin polymer layer on the surface of a component. In the subsequent text, painting is used to refer broadly to one of the above techniques or a similar method of providing a polymer layer on the component surface. An example of a welding operation is shown in FIG. 5. A thermosetting polymer composite component 70, has a thermoplastic surface 72 on a region of the component and has subsequently had a polymeric material coating 74 applied. A functional component 76, selected and/or designed according to the process of the invention, is placed with its thermoplastic surface 78 against the painted thermoplastic surface 80 of the composite component.

Where protrusions 82 are utilised as part of the second embodiment of the invention, these will most conveniently be located on the functional component. In a preferred embodiment, an ultrasonic welder horn 84 is then brought against the top face 86 of the functional component 76, such that pressure is applied through the welder horn 84 to the protruding thermoplastic surface 78 of the functional component 76. Under cyclic relative displacement, the protruding thermoplastic 82 of the functional component 76 displaces the paint 80 above the thermoplastic 72, causing it to move away from the tip of the protruding thermoplastic 82. Eventually the protruding thermoplastic 82 of the functional component 76 will contact the underlying thermoplastic surface 72 of the thermosetting composite component 70. In other aspects, welding occurs in the same manner as the first embodiment of the invention. Protrusions on the welding surface of a functional component may be similarly useful in removing paint in a spin welding operation. In this circumstance, the protrusions may gouge or scrape away the painted surface to reveal the underlying thermoplastic surface, which can then weld through the frictional build-up of heat.

Where the functional component is welded in the manner above, a weld will generally be achieved but the component may not be accurately located. Under high-frequency vibration, such as found in ultrasonic welding, there is a tendency for the functional component and the thermosetting composite laminate or component to move laterally with respect to each other. Lateral movement between the functional component and ultrasonic horn can be controlled by the shape of the upper interface on the functional component i.e. the surface that is in contact with the ultrasonic horn. Control of the lateral movement of the ultrasonic welder and functional component with respect to the thermosetting polymer composite component can also be achieved. One method is to provide a restraint, located temporarily or permanently on the composite component, that allows vertical movement of the functional component during the welding operation, but prevents significant horizontal movement. A second method is to use an apparatus such as that shown in FIG. 6. FIG. 6A shows schematically a functional component 90, a thermosetting polymer composite component 92 and section of an ultrasonic welder 94. Additionally, a structure for locating or applying pressure to the functional component or thermosetting polymer composite component is shown as a shroud 96 connected to the ultrasonic welder 94, in a manner such that the shroud 96 is not directly in contact with the ultrasonic welding horn 98. The shroud 96 can be used to resist lateral movement between the ultrasonic welder 94 and thermosetting composite component 92. The shroud 96, shown in section in the diagram, is annular, with an inner wall 100, outer wall 102, and flexible base material 104 suitable for making a hermetic seal. The flexible base material 104 may also be used to damp the vibration of the shroud against the thermosetting composite component 92, and for this purpose may be tacky or specially shaped or constructed to grip the surface or to damp vibration. The shroud 96 can be brought in contact with the thermosetting composite component 92, and the air between the inner wall 102 and outer wall 104 evacuated. This prevents the ultrasonic welder 94 moving laterally with respect to the thermosetting composite component 92. Advantageously, the shroud 96 can also be designed such that a net downward pressure is exerted on the ultrasonic welder 94 with respect to the thermosetting composite component 92, which can aid the welding process.

Figure 6B:
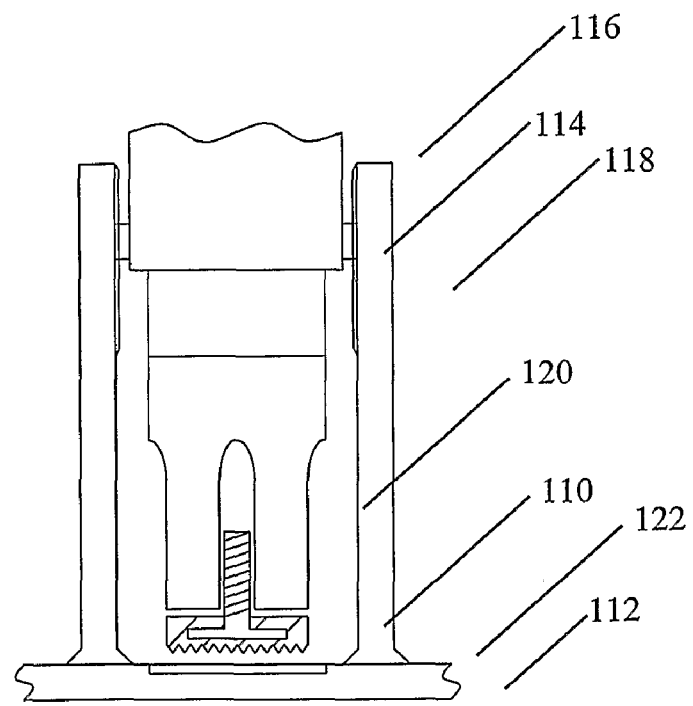
FIG. 6B is a schematic of a functional component or fitting, a cured thermosetting composite with a thermoplastic surface, and the lower segment of a welding apparatus with adjustable vacuum tubes.

A similar apparatus is shown in FIG. 6B, which allows for welding on a surface that is not flat, and allowing for optimised positioning of the welding horn. The functional component 110, thermosetting composite component 112 and ultrasonic welding equipment 114 are as described above. Connected to the ultrasonic welder casing 116 are one or more posts 118, in a manner such that the posts 118 are not directly in contact with the ultrasonic welding horn 120. The posts 118 have a hollow construction, and a flexible base material 122 suitable for making a hermetic seal. The posts 118 can slide vertically relative to the ultrasonic welding equipment 114, so that a curved or angular thermosetting composite component 112 can be in contact with all the posts 118 at the time of welding. Prior to welding, when the posts 118 have been adjusted to the desired height, the height of the posts 118 can be locked relative to the ultrasonic welder 114. Subsequently, the air inside the posts 118 can be evacuated, resulting in a resistance to lateral movement between the ultrasonic welder 114 and thermosetting composite component 112, and the exertion of net downward pressure on the functional component 110.

Other locating or positioning devices which may be used include guide devices which can be temporarily attached to the thermosetting composite component by vacuum, clamps, or removable adhesives, and which act as a guide or positioning device for the horn or the welder.

The above instances of welding apparatus are exemplary only, and may be achieved by variation on the principles outlined within the invention.

Experimental Discussion

A thermosetting polymer composite panel with thermoplastic surface was made according to the first embodiment of the invention by placing a layer of 254 µm PVDF thermoplastic film on a stack of preimpregnated plain woven fabric comprising T300 carbon fibre and Hexcel F593 epoxy resin. The stack was placed on a flat tool, and enclosed within a vacuum bag. The air within the vacuum bag was evacuated, and the stack subsequently cured at 177° C. and 0.63 MPa external pressure for 120 minutes. After curing, the thermoplastic layer was strongly attached to the composite substrate. A simple shape representing a functional component of 20×20 mm surface contact area, manufactured from PVDF polymer, was prepared for ultrasonic welding on one surface, by machining triangular grooves of 60° included angle horizontally and vertically on one surface of the polymer block. The result was a series of pyramid-shaped protrusions on one surface of the functional component, of 0.5 mm height and 0.58 mm spacing. The machined functional component surface and the thermoplastic surface of the thermosetting composite laminate were brought together following cleaning by propanol, and placed under an ultrasonic welder, operating at 20 kHz frequency. A pressure of approximately 0.2 MPa was applied to the welder horn and thus to the functional component. Following the application of ultrasonic vibration for 3 seconds and cooling under pressure, the functional component was firmly secured to the thermosetting polymer composite component. Subsequent pull-off testing showed an attachment strength of 5 MPa.

A second thermosetting polymer composite panel with thermoplastic surface was made according to the second embodiment of the invention by placing a layer of 254 µm PVDF thermoplastic film on a stack of preimpregnated plain woven fabric comprising T300 carbon fibre and Cycom 970 epoxy resin. The stack was placed on a flat tool, and enclosed within a vacuum bag. The air within the vacuum bag was evacuated, and the stack subsequently cured at 177° C. and 0.63 MPa external pressure for 120 minutes. After curing, the thermoplastic layer was securely attached to the composite substrate. The panel, including the thermoplastic surface, was subsequently painted using Akzo Nobel Aerodur Barrier Primer 37045 and Akzo Nobel Aerodur Finish C21/100 polyurethane enamel. A simple shape representing a functional component of 20×20 mm surface contact area, manufactured from PVDF polymer, was prepared for ultrasonic welding on one surface, by machining triangular grooves of 60° included angle horizontally and vertically on one surface of the polymer block. The result was a series of pyramid-shaped protrusions on one surface of the functional component, with 1.7 mm height and 2 mm spacing. The machined functional component surface and the painted thermoplastic surface of the thermosetting composite laminate were brought together and placed under an ultrasonic welder, operating at 20 kHz frequency. A pressure of approximately 1 MPa was applied to the welder horn and thus to the functional component. Following the application of ultrasonic vibration for 1 second and cooling under pressure, the functional component was firmly secured to the thermosetting polymer composite component. Later inspection showed that the thermoplastic of the functional component had attached directly to the thermoplastic surface of the composite component. Subsequent pull-off testing showed an attachment strength of 3 MPa.

The invention claimed is:

1. A method of joining a functional component to a thermosetting polymer composite component, the thermosetting composite component comprising a thermosetting polymer composite material, with a thermoplastic polymer layer on at least the part of the surface to be joined, the method including the steps of:

forming the thermoplastic layer on the thermosetting polymer composite component by selecting uncured thermosetting polymer composite resin constituents and a first thermoplastic polymer, that have Hansen solubility parameters indicative of the ability of the thermoplastic polymer and uncured thermosetting polymer resin constituents to interpenetrate;

locating said thermoplastic polymer in contact with the uncured thermosetting polymer composite component, so that at least a part of one surface of the composite component when cured consists of said thermoplastic polymer;

heating the thermoplastic polymer and uncured thermosetting polymer composite component to the curing temperature of the thermosetting polymer, the uncured thermosetting polymer resin constituents and the thermoplastic polymer being able to at least partly interpenetrate before the thermosetting polymer cures; and cooling the thermoplastic polymer and cured thermosetting polymer component such that the thermoplastic polymer is very strongly bonded to the cured thermosetting polymer component;

the method further including the steps of selecting a functional component that has a second thermoplastic polymer at least on the surface to be joined, the second thermoplastic polymer being selected such that it can form high strength joints with the thermoplastic surface of said thermosetting polymer composite component in high-frequency oscillating relative displacement welding operations;

locating the thermoplastic surface of said composite component in intimate contact with the thermoplastic surface of said functional component;

applying a high-frequency oscillating relative displacement between said thermosetting polymer composite component and said functional component, such that at least a portion of the respective thermoplastic surfaces of the components at least partly melt and fuse;

halting the high-frequency oscillating relative displacement and holding said thermosetting polymer composite component and said functional component together in a fixed relationship, such that the molten thermoplastic or thermoplastics resolidifies and the components are welded together.

2. The method according to claim 1 wherein the thermoplastic surface on at least one of the functional component or thermosetting polymer composite component is shaped with one or more protrusions.

3. The method according to claim 2 where the height of thermoplastic surface protrusions on the functional component is less than or equal to the thickness of thermoplastic on the thermosetting polymer composite component.

4. The method of joining a functional component to a thermosetting polymer composite component of claim 1
wherein after the thermoplastic polymer and cured thermosetting polymer component have been cooled and the thermoplastic polymer is very strongly bonded to the cured thermosetting polymer component the thermosetting polymer component, including the thermoplastic surface, is coated with a layer of polymeric material;
the second thermoplastic polymer having been selected such that it can form high strength joints with the thermoplastic surface beneath the polymeric coating of said thermosetting polymer composite component in high-frequency oscillating relative displacement welding operations;
and the high-frequency oscillating relative displacement welding step is applied such that at least a portion of the polymeric material coating above the thermoplastic surface is displaced and at least a portion of the respective thermoplastic surfaces of the components come into contact, melt fuse.

5. The method according to claim 4 wherein the thermoplastic surface on the functional component is shaped with one or more protrusions.

6. The method according to claim 5 wherein the thermoplastic surface protrusions on the functional component have a height greater than the thickness of polymeric material coating covering the thermoplastic layer on the surface of the thermosetting composite component.

7. The method according to claim 6 wherein the thermoplastic surface protrusions on the functional component are at least 0.5 mm in height.

8. The method according to claim 1 or 4 wherein the thermoplastic polymer of the functional component or thermosetting polymer composite component surface is selected from the group of a pure thermoplastic polymer, a copolymer or a polymer blend.

9. The method according to claim 1 or 4 wherein the thermoplastic layer on the composite component is at least 20 microns and less than 5 mm in thickness.

10. The method according to claim 1 wherein an additional layer comprising a thermoplastic polymer is included between the thermosetting polymer composite component and functional component prior to application of high frequency oscillating relative displacement.

11. The method according to claim 1 or 4 wherein more than one functional component is joined to the thermosetting polymer composite component.

12. The method according to claim 1 or 4 wherein the thermoplastic polymer of the functional component or thermosetting polymer composite component surface is classed either as a semi-crystalline or amorphous polymer.

13. The method according to claim 1 or 4 wherein the first surfacing thermoplastic polymer on the thermosetting composite component is a different thermoplastic polymer to the second thermoplastic polymer on the functional component.

14. The method according to claim 1 or 4 wherein the thermoplastic polymer on the thermosetting composite component or the functional component or both is PVDF.

* * * * *